US009354674B2

(12) United States Patent
Stackhouse et al.

(10) Patent No.: US 9,354,674 B2
(45) Date of Patent: May 31, 2016

(54) TRANSPORTATION, STORAGE AND STABILIZATION DEVICE FOR ELECTRONIC EQUIPMENT

(71) Applicants: Barbara Copeland Stackhouse, Middletown, NY (US); Lawrence Stackhouse, Middleton, NY (US)

(72) Inventors: Barbara Copeland Stackhouse, Middletown, NY (US); Lawrence Stackhouse, Middleton, NY (US)

(*) Notice: Subject to any disclaimer, the term of this patent is extended or adjusted under 35 U.S.C. 154(b) by 44 days.

(21) Appl. No.: 14/481,350

(22) Filed: Sep. 9, 2014

(65) Prior Publication Data

US 2016/0070312 A1    Mar. 10, 2016

(51) Int. Cl.
*G06F 1/16* (2006.01)
*G06F 1/18* (2006.01)
*H01R 43/26* (2006.01)

(52) U.S. Cl.
CPC . *G06F 1/18* (2013.01); *H01R 43/26* (2013.01)

(58) Field of Classification Search
USPC ............. 455/575.8, 150.1, 180.2, 330, 572, 455/343.1, 550.1, 230; 312/223.1, 125, 312/135, 236, 326, 117, 258; 439/676, 578, 439/460, 587, 59, 660, 493, 893, 165, 131; 190/102, 108; 174/655, 660, 169, 174/158 R, 51, 75 R, 254, 350, 50, 262, 174/117 F; 361/679.27, 679.08, 679.47, 361/679.54, 679.02, 679.44, 679.41, 361/679.55, 679.3, 679.26, 679.49, 679.48; 248/551, 514, 316.1, 176.3, 422, 211.1
See application file for complete search history.

(56) References Cited

U.S. PATENT DOCUMENTS

| | | | |
|---|---|---|---|
| 2014/0217863 A1* | 8/2014 | Rayner | G06F 1/1626 312/223.1 |
| 2015/0358439 A1* | 12/2015 | Carnevali | H04M 1/0254 455/575.8 |

* cited by examiner

*Primary Examiner* — Hung Duong
(74) *Attorney, Agent, or Firm* — Dunlap, Bennett & Ludwig PLLC

(57) ABSTRACT

An equipment saddle is provided. The equipment saddle may include a plurality of cases attached to a drapable skirt. Each case forms a compartment for retaining and stabilizing electronic equipment, such as an external hard drive, wherein at least one case provides a port aperture for sliding a data wire therethrough for interconnecting the electronic equipment and a computer while the electronic equipment is positioned within the compartment. The equipment saddle may provide at least one cinching strap so that the skirt can be as easily draped and secured to, say, the corners of the computer's screen as they are draped and secured to the shoulders of a user. As a result, the equipment saddle facilitates the stabilization, storage and transportation of electronic equipment from computer to computer without the need to take such electronic equipment out of the plurality of cases.

10 Claims, 3 Drawing Sheets

TRANSPORTATION, STORAGE AND STABILIZATION DEVICE FOR ELECTRONIC EQUIPMENT

BACKGROUND OF THE INVENTION

The present invention relates to transportation and storage devices for using electronic equipment and, more particularly, to a transportation and storage device for using non-wireless electronic equipment.

Currently, the use of external computer memory equipment involves dangling wires/cables and finding space for the memory equipment, while its transportation involves a disparate carrying device, such as a back pack, or pockets that play no role in the use of the memory equipment. Moreover the wires/cables may become twisted together, making disconnection difficult and cumbersome. Second, the placement of the memory equipment in combination with the wires/cables may cause unwanted strain upon the memory equipment, tugging on wires/cables and/or the connection ports. The above-mentioned issues need to be addressed and readdressed every time a user wants to transport the memory equipment.

As can be seen, there is a need for a single device that facilitates the use, storage and transportation of electronic equipment.

SUMMARY OF THE INVENTION

In one aspect of the present invention, a method of employing an apparatus for storing, transporting and stabilizing electronic equipment having at least one port for wiring connections to a computer, comprises the steps of: providing the apparatus comprising a drapable skirt providing at least one case for the electronic equipment, wherein the at least one case forms a receptacle opening and a port aperture; and at least one cinching strap is looped through a portion of the skirt; positioning the electronic equipment through the receptacle opening and in the at least one case so that at least one port is adjacent to the port aperture; passing the wiring connection through the port aperture to establish wiring connections between the electronic equipment and the computer; and draping the at least one cinch strap about at least one corner of the computer for operably retaining the at drapable skirt thereto.

In another aspect of the present invention, an apparatus for storing, transporting and stabilizing electronic equipment having at least one port for wiring connections to a computer, comprises: a drapable skirt having at least one case for the electronic equipment having ports, wherein the at least one case forms a receptacle opening and a port aperture; and at least one cinching strap looped through a portion of the skirt.

In yet another aspect of the present invention, an apparatus for storing, transporting and stabilizing an external hard drive having at least one port for wiring connections to a computer, comprises: a drapable skirt providing at least one case for the electronic equipment having ports, wherein the at least one case forms a receptacle opening and a port aperture; an encasing flap on each case that extends over the receptacle opening, the encasing flap positionable in a closed position, enclosing the receptacle opening, and an open position; a locking fastener on each encasing flap, positionable in a locked position, preventing the electronic equipment located in each case from exiting the receptacle opening, and an unlocked position; at least one cinching strap looped through a portion of the skirt; a cinching element on the at least one cinching strap for adjusting the length thereof; and the external hard drive located in the at least one case so that the at least one port is adjacent to the port aperture.

An important function of the at least one case provided by the drapable skirt is to transport, store and stabilize technology, i.e., external, portable hard drive in order to create a "work, reading or relaxation," station in tight or close places, e.g., airport lobbies, airline seats, train or bus depots, subway seats, restaurants, etc. For example, this apparatus will allow individuals to work on information stored in an external portable hard drive while in transit without having to be concerned with storage and stabilization of technological equipment. External memory devices are easily stored in the at least one case while in use. Flash drives and SD cards may also be stored in the at least one case, and can be removed and inserted into the computer for use.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an equipment saddle. The equipment saddle may include a plurality of cases attached to a drapable skirt. Each case forms a compartment for retaining, for example, electronic equipment, wherein at least one case provides a port aperture for sliding a data wire therethrough for interconnecting electronic equipment and a computer while the electronic equipment is positioned within the compartment. The equipment saddle may provide at least one cinching strap so that the skirt can be as easily draped and secured to, say, the corners of the computer's screen as they are draped and secured to the shoulders of a user. As a result, the equipment saddle facilitates the use, storage and transportation of electronic equipment from computer to computer without the need to take such electronic equipment out of the plurality of cases.

Figure 1:
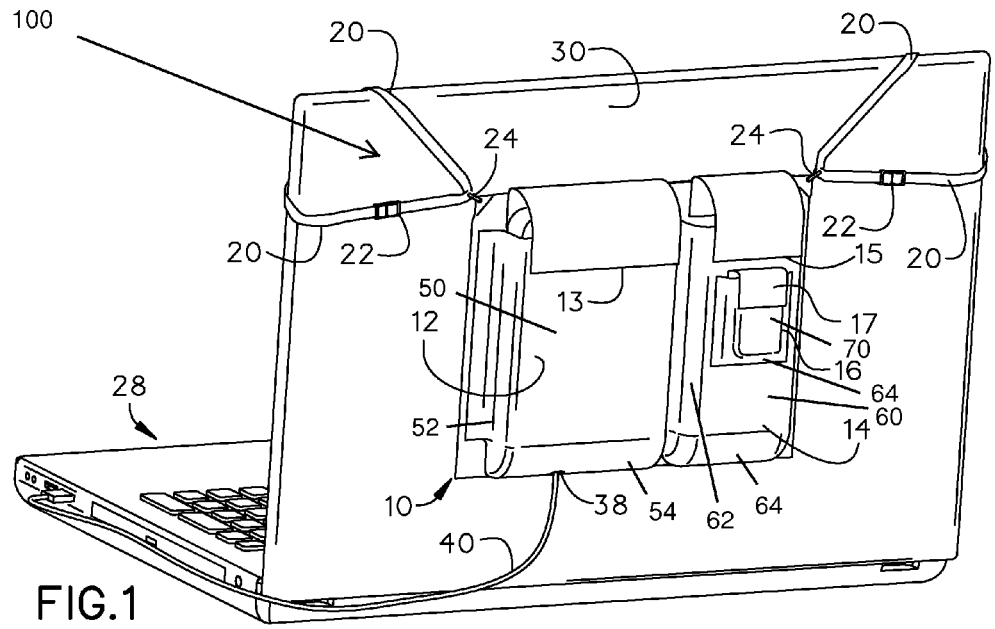
FIG. 1 is a rear view of an exemplary embodiment of the present invention.
Figure 2:
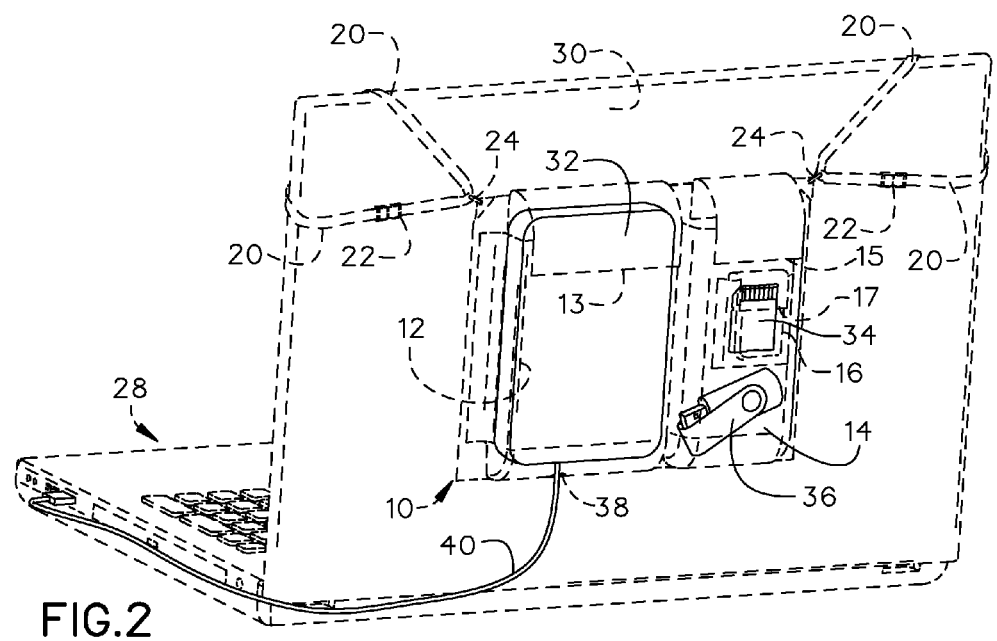
FIG. 2 is a rear view of an exemplary embodiment of the present invention, illustrated in use.

Referring to FIGS. 1 through 5, the present invention may include an equipment saddle 100 for portably storing a plurality of equipment 90. The equipment saddle 100 may provide a drapable skirt 10 or planar base sheet of draping fabric and or draped garment material. The draping material may be provided with a textural bias to facilitate the drapabilty of the skirt 10. The flexibility afforded by the draping fabric and or draped garment material may minimize the bulk of the equipment saddle 100, especially between the equipment 90 and a rider 30 thereof. The rider 30 may be an object having sufficiently opposed corners, such as, but not limited to, a generally vertical screen 30 of a computer 28, though in other instances may be a pair of shoulders of a human being. The equipment 90 may be, but not limited to, electronic equipment 90 such as a form of computer memory 32, such as external computer memory, a SD card 34, a USB drive 36 and the like. Preferably the skirt 10 has a sufficient size and shape to accommodate the equipment 90 to be portably stored by the rider 30. The equipment 90 may have at least one port for wiring connections to a computer 30, as illustrated in FIG. 2.

Figure 5:
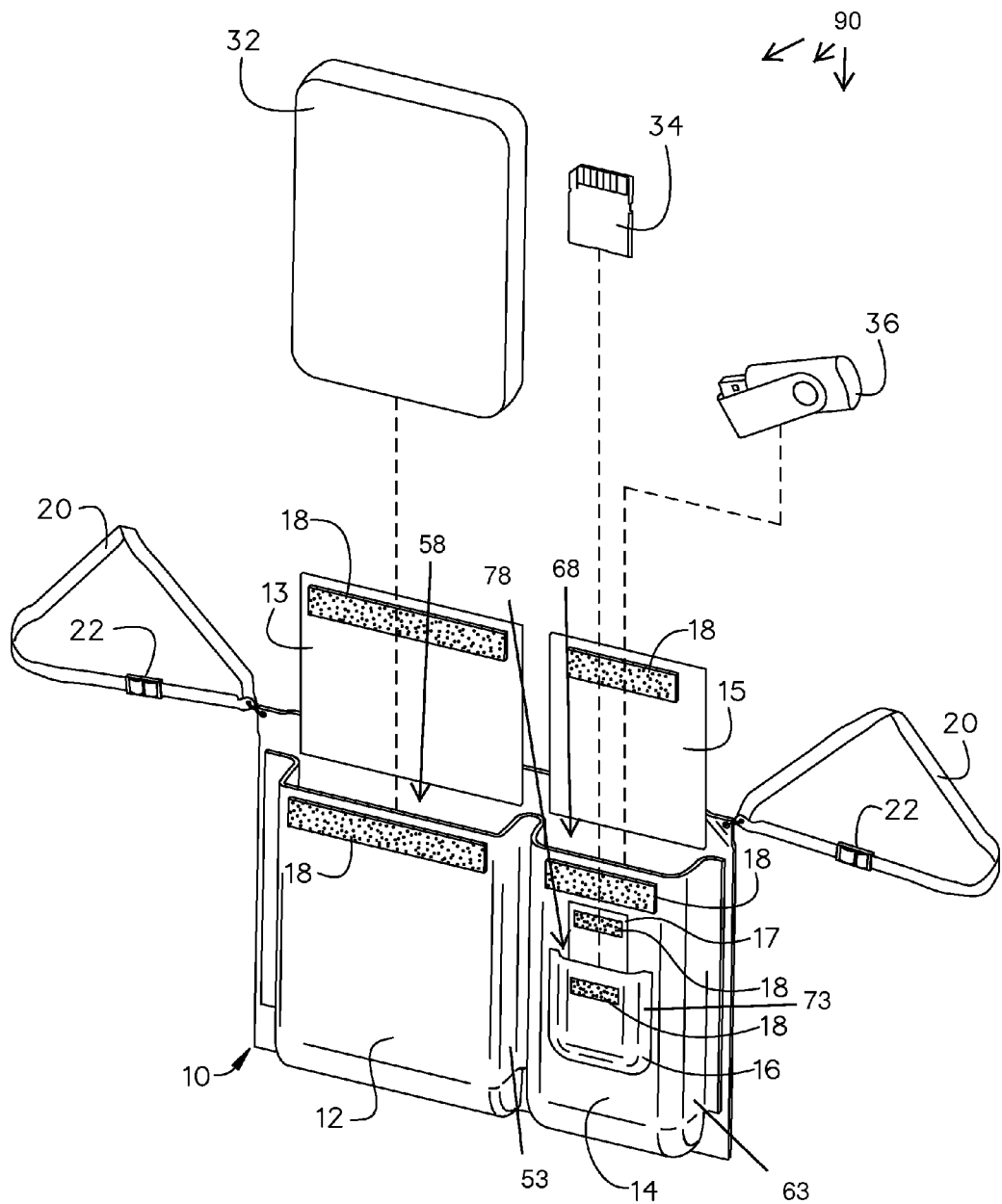
FIG. 5 is an exploded view of an exemplary embodiment of the present invention, illustrating the use of a plurality of cases.

The equipment saddle 100 may provide a first case 12 attached to a portion of the skirt 10, as illustrated in FIG. 1. The first case 12 provides a front wall 50, side walls 52 and 53 and a bottom wall 54 defining a first compartment 58 having a receptacle opening. The first case 12 may include an encasing flap 13. The inside surface of a portion of the encasing flap 13 and an outside surface of a portion of the front wall 50 may have cooperating hook and loop attachments 18, whereby the encasing flap 13 folds to enclose and mate said cooperating attachments 18 or to reveal the compartment 58, as illustrated in FIGS. 2 and 5. The bottom wall 54 may provide a port aperture 38 for allowing a data wire 40, plug-in cable connector, or the like to communicate through the port aperture 38 and into the first case 12.

The equipment saddle 100 may provide a second case 14 attached to a portion of the skirt 10, as illustrated in FIG. 1. The second case 14 provides a front wall 60, side walls 62 and 63 and a bottom wall 64 defining a first compartment 68 having a receptacle opening. The second case 14 may include an encasing flap 15. The inside surface of a portion of the encasing flap 15 and an outside surface of a portion of the front wall 60 may have cooperating hook and loop attachments 18, whereby the encasing flap 15 folds to enclose and mate said cooperating attachments 18 or to reveal the compartment 68, as illustrated in FIGS. 2 and 5. The bottom wall 64 may provide a port aperture for allowing a data wire 40, plug-in cable connector, or the like to communicate through the port aperture and into the second case 14.

The smaller third case 16 may be attached to a portion of the front wall 60, as illustrated in FIG. 1, to overlie a portion of the second case 14. The third case 16 provides a front wall 70, side walls 72 and 73 and a bottom wall 74 defining a first compartment 78 having a receptacle opening. The third case 16 may include an encasing flap 17. The inside surface of a portion of the encasing flap 17 folds to enclose and mate said cooperating attachments 18 or to reveal the compartment 78, as illustrated in FIGS. 2 and 5. The bottom wall 74 may provide a port aperture for allowing a data wire 40, plug-in cable connector, or the like to communicate through the port aperture and into the third case 16.

Each case 12, 14, 16 may be made from flexible material that facilitates the stability of objects, such as electronic equipment, contained within the cases 12, 14, 16.

It should be understood that the plurality of fasteners 18 may be any locking fastener known in the art for fastening or removably securing one object to another including, for example, standard push-button snaps, Velcro-type fasteners, adhesive substances, combinations thereof, and the like. It should also be that the plurality of fasteners 18 may be configured in any array and/or number, so long as the fasteners function in accordance with the present invention as described herein. Each fastener 18 or cooperating set of fasteners 18 are positionable in a locked position, preventing the electronic equipment located in each case from exiting the receptacle opening, and an unlocked position.

Figure 4:
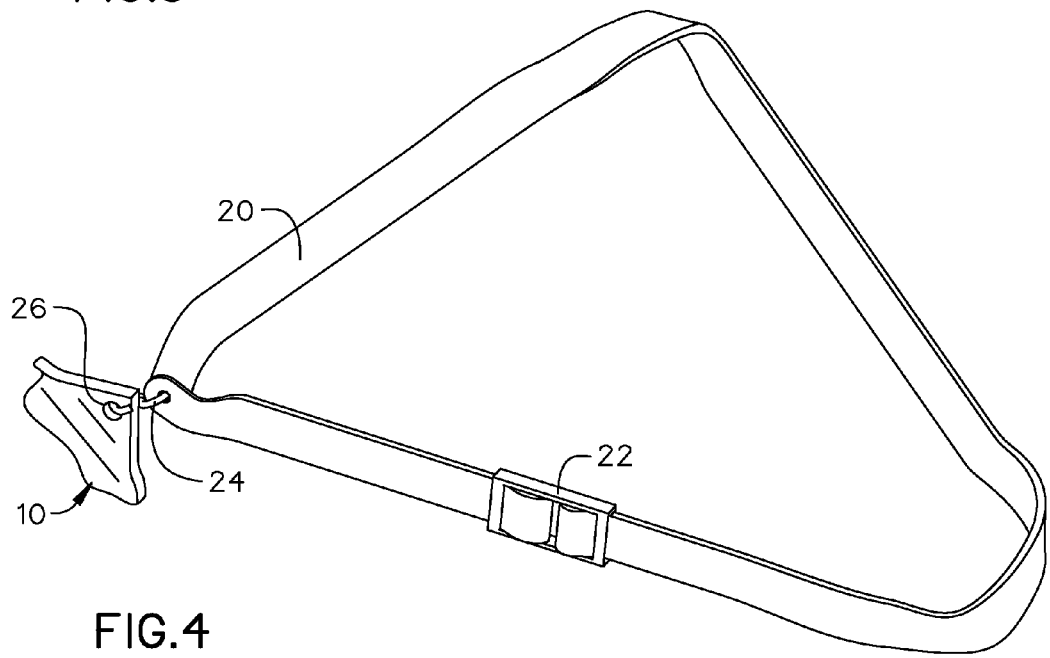
FIG. 4 is a detailed perspective view of an exemplary embodiment of a cinching strap of the present invention.

The skirt 10 may be generally rectangular in shape having two sides and two edges; though the skirt can be substantially, oval, square, triangular or other geometric shapes. The skirt 10 may define a strap aperture 26 near at least two corners of the skirt 10. In certain embodiments, the equipment saddle 100 may provide two adjustable cinch straps 20 made of stretchable, elastic material. Each cinch straps 20 may have two opposing ends and a cinching element 24 therebetween. The cinching element 24 may be adapted for adjusting the length of its cinch strap 20. The two opposing ends of each cinching strap 20 may be joined by an annular fastener 24 so as to form a loop, as illustrated in FIG. 4; the loop being adjustable by means of the cinching element 22. Each annular fastener 24 may be connected through one strap aperture 26 so that the skirt 10 may be supported by cooperating cinching straps 20 while the cases 12, 14, 16 are operable for retaining the equipment 90 therein.

Figure 3:
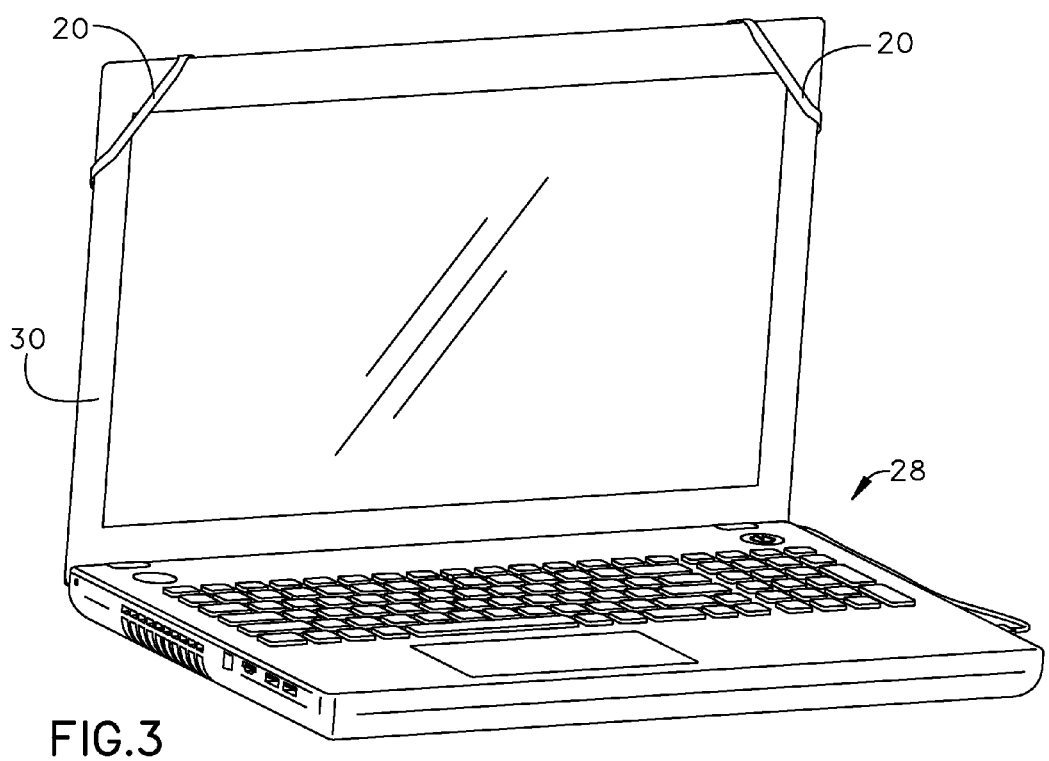
FIG. 3 is a front view of an exemplary embodiment of the present invention, illustrated in use.

A method of using the present invention may include the following. The equipment saddle 100 as disclosed above may be provided. A user may store the plurality of equipment 90 in the cases 12, 14, 16. For example, the user may place the external memory 32 within the first compartment 58, the SD card 34 within the second compartment 68, and the USB drive 36 within the third compartment 78. The user may then fold the encasing flaps 13, 15, 17 down so as to encase the equipment 90 within the compartments 58, 68, 78, respectively. The user may secure, say, two cinch straps 20 about opposing corners of the computer screen 30, as illustrated in FIG. 3, to retain the equipment saddle 100 thereto. The user may utilize at least one cinching element 22 to adjust the length of at least one cinch strap 20 so as to more securely retain the equipment saddle 100. Then the user may interconnect the, say, external memory 32 positioned within the first compartment 58 and the computer 28 by the data wire 40 that slides through the access aperture 38 to establish the wiring connection between the external memory 32 and the computer 28.

When on the go, the user may disconnect said data wire 40 and remove the two cinch straps 20 from the computer screen 30 so as to place them about their shoulders, thereby carrying, like a backpack, the equipment saddle 100 and all the equipment 90 stored therein to the user's next destination.

It should be understood, of course, that the foregoing relates to exemplary embodiments of the invention and that modifications may be made without departing from the spirit and scope of the invention as set forth in the following claims.

What is claimed is:

1. A method of employing an apparatus for storing, transporting and stabilizing electronic equipment having at least one port for wiring connections to a computer, comprising the steps of:

providing the apparatus comprising a drapable skirt providing at least one case for the electronic equipment, wherein the at least one case forms a receptacle opening and a port aperture; and at least one cinching strap is looped through a portion of the skirt;

positioning the electronic equipment through the receptacle opening and in the at least one case so that at least one port is adjacent to the port aperture;

passing the wiring connection through the port aperture to establish wiring connections between the electronic equipment and the computer; and draping the at least one cinch strap about at least one corner of the computer for operably retaining the at drapable skirt thereto.

2. The method of claim 1 furthering providing including an encasing flap on each case that extends over the receptacle opening, and extending the encasing flap positionable in a closed position, enclosing the receptacle opening.

3. The method of claim 2 further including a locking fastener on each encasing flap, positionable in a locked position, preventing the electronic equipment located in each case from exiting the receptacle opening, and an unlocked position.

4. The method of claim 1, further including a cinching element on the at least one cinching strap for adjusting the length thereof.

5. An apparatus for storing, transporting and stabilizing electronic equipment having at least one port for wiring connections to a computer, comprising:
   a drapable skirt having at least one case for the electronic equipment having ports, wherein the at least one case forms a receptacle opening and a port aperture; and
   at least one cinching strap looped through a portion of the skirt.

6. The apparatus of claim 5 furthering including positioning the electronic equipment in the at least one case so that the at least one port is adjacent to the port aperture.

7. The apparatus of claim 5 furthering including an encasing flap on each case, and extending the encasing flap in a closed position.

8. The apparatus of claim 7 further including a locking fastener on each encasing flap, and positioning the locking fastener in the locked position.

9. The apparatus of claim 5 further including a cinching element on the at least one cinching strap, and cinching the cinching element to adjust the length of the at least one cinching strap.

10. An apparatus for storing, transporting and stabilizing an external hard drive having at least one port for wiring connections to a computer, comprising:
   a drapable skirt providing at least one case for the electronic equipment having ports, wherein the at least one case forms a receptacle opening and a port aperture;
   an encasing flap on each case that extends over the receptacle opening, the encasing flap positionable in a closed position, enclosing the receptacle opening, and an open position;
   a locking fastener on each encasing flap, positionable in a locked position, preventing the electronic equipment located in each case from exiting the receptacle opening, and an unlocked position;
   at least one cinching strap looped through a portion of the skirt;
   a cinching element on the at least one cinching strap for adjusting the length thereof; and
   the external hard drive located in the at least one case so that the at least one port is adjacent to the port aperture.

* * * * *